United States Patent
Bevc et al.

(10) Patent No.: US 6,687,618 B2
(45) Date of Patent: *Feb. 3, 2004

(54) TYPING PICKS TO HORIZONS IN MIGRATION VELOCITY ANALYSIS

(75) Inventors: Dimitri Bevc, Pleasanton, CA (US); Alexander M. Popovici, Portola Valley, CA (US); Wei Liu, San Jose, CA (US)

(73) Assignee: 3D Geo Development, Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/924,123

(22) Filed: Aug. 7, 2001

(65) Prior Publication Data

US 2002/0042678 A1 Apr. 11, 2002

Related U.S. Application Data

(60) Provisional application No. 60/223,458, filed on Aug. 7, 2000.

(51) Int. Cl.[7] .................................................. G01V 1/28
(52) U.S. Cl. ........................................... 702/14; 702/18
(58) Field of Search ............................... 702/14, 16, 17, 702/18; 367/73

(56) References Cited

U.S. PATENT DOCUMENTS

| | | | | |
|---|---|---|---|---|
| 4,984,220 A | | 1/1991 | Bodine et al. | |
| 5,089,994 A | * | 2/1992 | Harlan et al. ................. | 367/73 |
| 5,128,899 A | * | 7/1992 | Boyd et al. .................... | 367/50 |
| 5,157,637 A | * | 10/1992 | Wang ........................... | 367/38 |
| 5,157,638 A | * | 10/1992 | Loumos et al. ............... | 367/54 |
| 5,189,643 A | | 2/1993 | Wang et al. | |
| 5,229,940 A | * | 7/1993 | Wang et al. ................... | 702/16 |
| 5,513,150 A | * | 4/1996 | Sicking et al. ................ | 367/73 |
| 5,587,942 A | * | 12/1996 | Krebs ........................... | 367/50 |
| 5,629,904 A | * | 5/1997 | Kosloff et al. ................ | 367/53 |
| 5,640,368 A | | 6/1997 | Krebs | |
| 5,696,735 A | * | 12/1997 | Krebs ........................... | 367/50 |
| 6,002,642 A | * | 12/1999 | Krebs ........................... | 367/73 |
| 6,058,073 A | * | 5/2000 | VerWest ....................... | 367/31 |
| 6,253,157 B1 | * | 6/2001 | Krebs ........................... | 702/18 |
| 6,269,310 B1 | * | 7/2001 | Washbourne ................. | 702/17 |
| 6,388,947 B1 | * | 5/2002 | Washbourne et al. ......... | 367/73 |
| 6,493,634 B1 | * | 12/2002 | Krebs et al. ................... | 702/14 |
| 6,546,339 B2 | * | 4/2003 | Bevc et al. .................... | 702/18 |

OTHER PUBLICATIONS

Al–Yahya, "Velocity Analysis by Iterative Profile Migration," Geophysics 54(6): 718–729, 1989.

Bednar et al., "Residual Tomographic Updating," SEG 1999 Expanded Abstracts, 1251–1254, 69th Annual Meeting, Society of Exploration Geophysicists, 1999.

Biondi, "Azimuth Moveout + Common Azimuth Migration: Cost–Effective Prestack Depth Imaging of Matine Data," SEG 1997 Expanded Abstracts, 1375–1378, 67th Annual Meeting, Society of Exploration Geophysicists, 1997.

Biondi et al., "Wave Equation Migration Velocity Analysis," SEG 1999 Expanded Abstracts, 1723–1726, 69th Annual Meeting, Society of Exploration Geophysicists, 1999.

(List continued on next page.)

Primary Examiner—Marc S. Hoff
Assistant Examiner—Anthony Gutierrez
(74) Attorney, Agent, or Firm—Andrei D. Popovici

(57) ABSTRACT

A seismic velocity analysis method includes tying velocity parameter values such as residual velocity values to geological horizons (reflectors) within a seismic exploration volume. Common image gathers (CIGs) such a common reflection point (CRP) gathers or angle-domain common image gathers (ACIGs) are generated for a set of CIG grid points. Computed best-fit residual velocity values are then snapped to a neighboring horizon or vertically interpolated to the horizon, to generate residual velocity values along the horizon. The residual velocity values for points along the horizon are then selectively employed in updating the velocity model for the volume of interest.

37 Claims, 6 Drawing Sheets

OTHER PUBLICATIONS

Bloor et al., "Tomographic Velocity Model Updating for Prestack Depth Migration," SEG 1999 Expanded Abstracts, 1255–1258, 69$^{th}$ Annual Meeting, Society of Exploration Geophysicists, 1999.

Clapp et al., "Short Note: Interval Velocity Estimation with a Null Space," Stanford Exploration Project Report SEP–97, 147–157, 1998.

Clapp et al., "Tau Domain Migration Velocity Analysis using Angle CRP Gathers and Geologic Constraints," SEG 2000 Expanded Abstracts, 70$^{th}$ Annual Meeting, Society of Exploration Geophysicists, Aug. 6–11, 2000.

Deregowski, "Common Offset Migrations and Velocity Analysis," First Break 8(6): 225–234, 1990.

Jiao et al., "Residual Migration Velocity Analysis in the Plane–Wave Domain," SEG 2000 Expanded Abstracts, 942–945, 70$^{th}$ Annual Meeting, Society of Exploration Geophysicists, Aug. 6–11, 2000.

Koren et al., "3D Local Tomography—Residual Interval Velocity Analysis on a Depth Solid Model," SEG 1999 Expanded Abstracts, 1255–1258, 69$^{th}$ Annual Meeting, Society of Exploration Geophysicists, 1999.

Lafond et al., "Migration Moveout Analysis and Depth Focusing," Geophysics 58(1): 91–100, 1993.

Liu et al., "Velocity Analysis by Residual Moveout," SEG 1992 Expanded Abstracts, 1034–1037, 62$^{th}$ Annual Meeting, Society of Exploration Geophysicists, 1992.

Liu et al., "Mathematical Analysis of Residual Moveout and Velocity Analysis," SEG 1995 Expanded Abstracts, 1201–1203, 65$^{th}$ Annual Meeting, Society of Exploration Geophysicists, 1995.

Liu, "An Analytical Approach to Migration Velocity Analysis," Geophysics 62(4): 1238–1248, 1997.

Meng et al., "3–D Analytical Migration Velocity Analysis I: Two–Step Velocity Estimation by Reflector–Normal Update," SEG 1999 Expanded Abstracts, 1727–1730, 69$^{th}$ Annual Meeting, Society of Exploration Geophysicists, 1999.

Ottolini et al., "The Migration of Common Midpoint Slant Stacks," Geophysics 49(3): 237–249, 1984.

Perrot et al., "3D Migration Velocity Analysis using Genetic Algorithm,", SEG 1997 Expanded Abstracts, 1812–1814, 67$^{th}$ Annual Meeting, Society of Exploration Geophysicists, 1997.

Prucha et al., "Angle–Domain Common Image Gathers by Wave–Equation Migration," SEG 1999 Expanded Abstracts, 824–827, 69$^{th}$ Annual Meeting, Society of Exploration Geophysicists, 1999.

Rickett et al., "Offset and Angle Domain Common–Image Gathers for Shot–Profile Migration," Stanford Exploration Project Report SEP–108: 27–35, Mar. 29, 2001.

Stork, "Demonstration of MVA Tomography with Controls and Constraints for Determining an Accurate Velocity Model for Prestack Depth Migration," SEG 1994 Expanded Abstracts, 1338–1342, 64$^{th}$ Annual Meeting, Society of Exploration Geophysicists, 1994.

Stork, "Reflection Tomography in the Postmigrated Domain," Geophysics 57: 680–692, 1992.

Stork, "The Role of Tomography in Migration Velocity Analysis," Society of Exploration Geophysicists (SEG), Denver chapter newsletter, 1997.

Stork et al., "Linear Aspects of Tomographic Velocity Analysis," Geophysics 56(4): 483–495, 1991.

Taner et al., "Depth Migration Velocity Analysis," Seismic Migration 5: Velocity Estimation SEG 1991 Expanded Abstracts, 1218–1221, 61$^{st}$ Annual Meeting, Society of Exploration Geophysicists, 1991.

Vasco, "Bounding Seismic Velocities using a Tomographic Method," Geophysics 56(4):472–482, 1991.

* cited by examiner

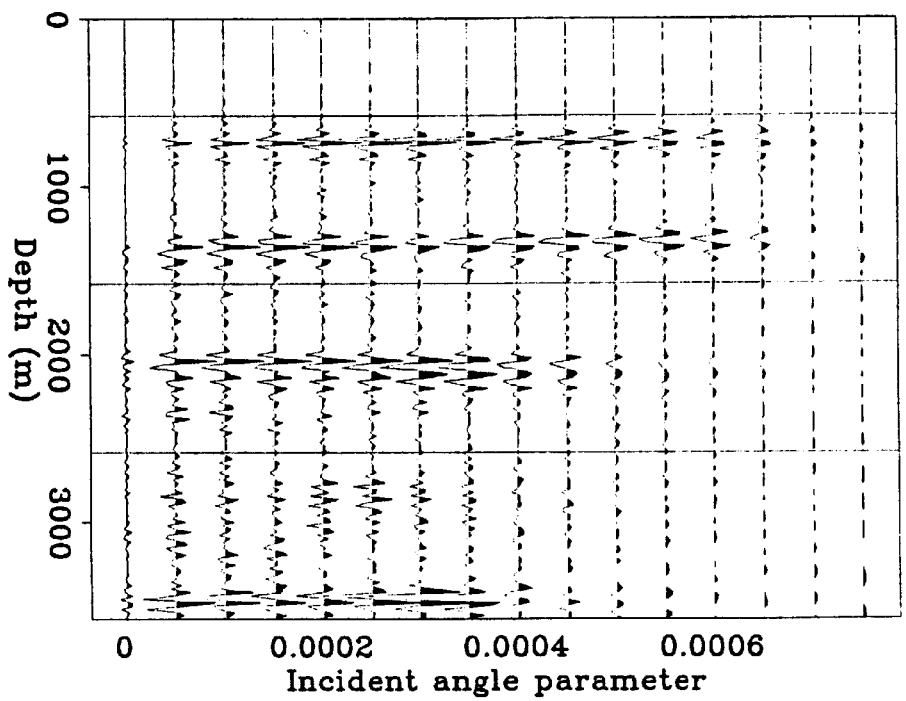
FIG. 2-A
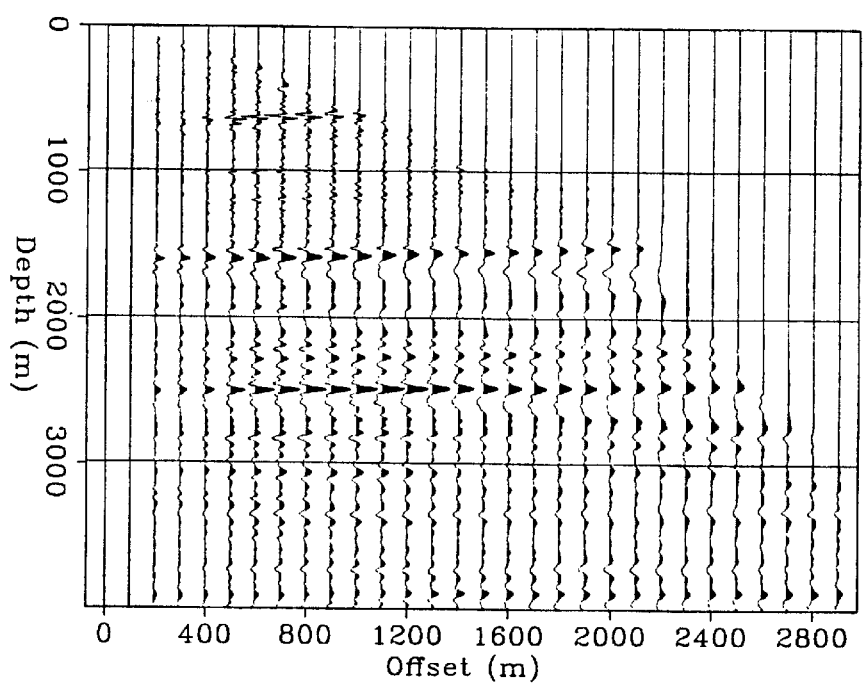
FIG. 2-B

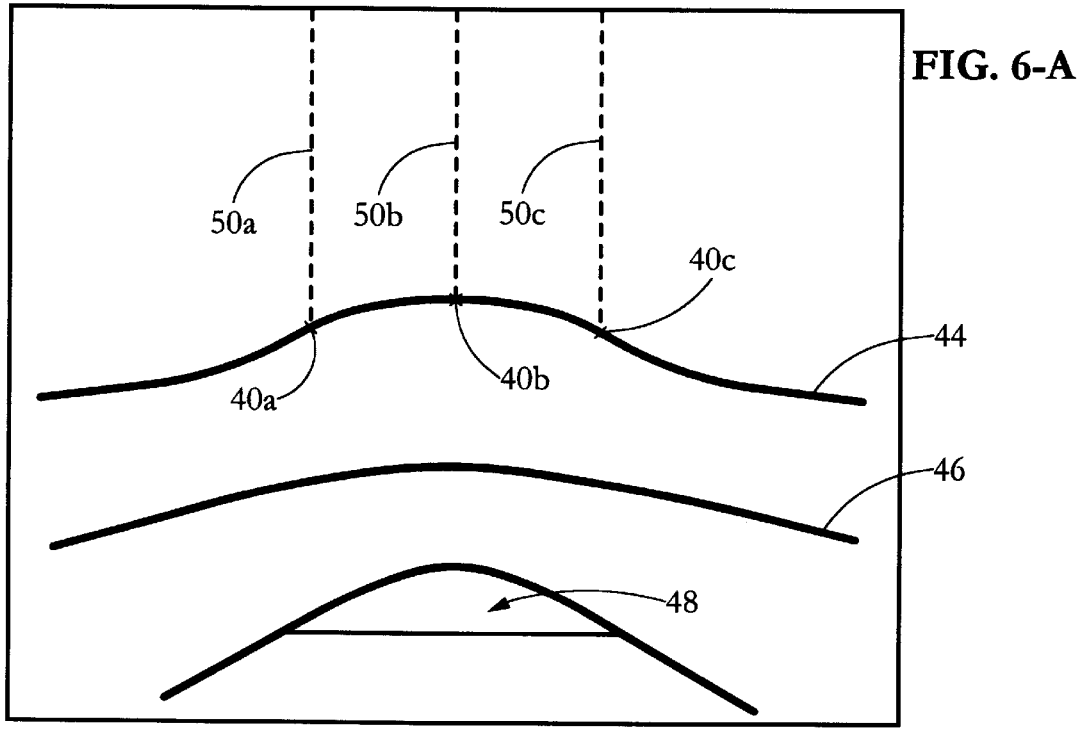
FIG. 6-A
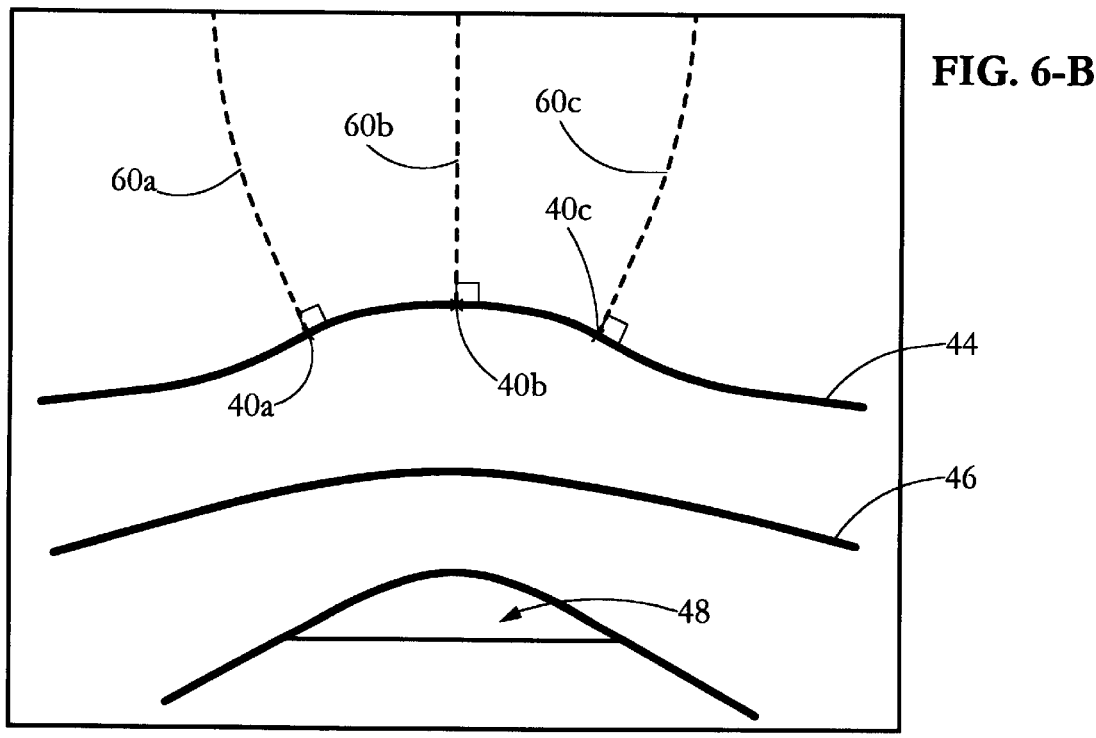
FIG. 6-B

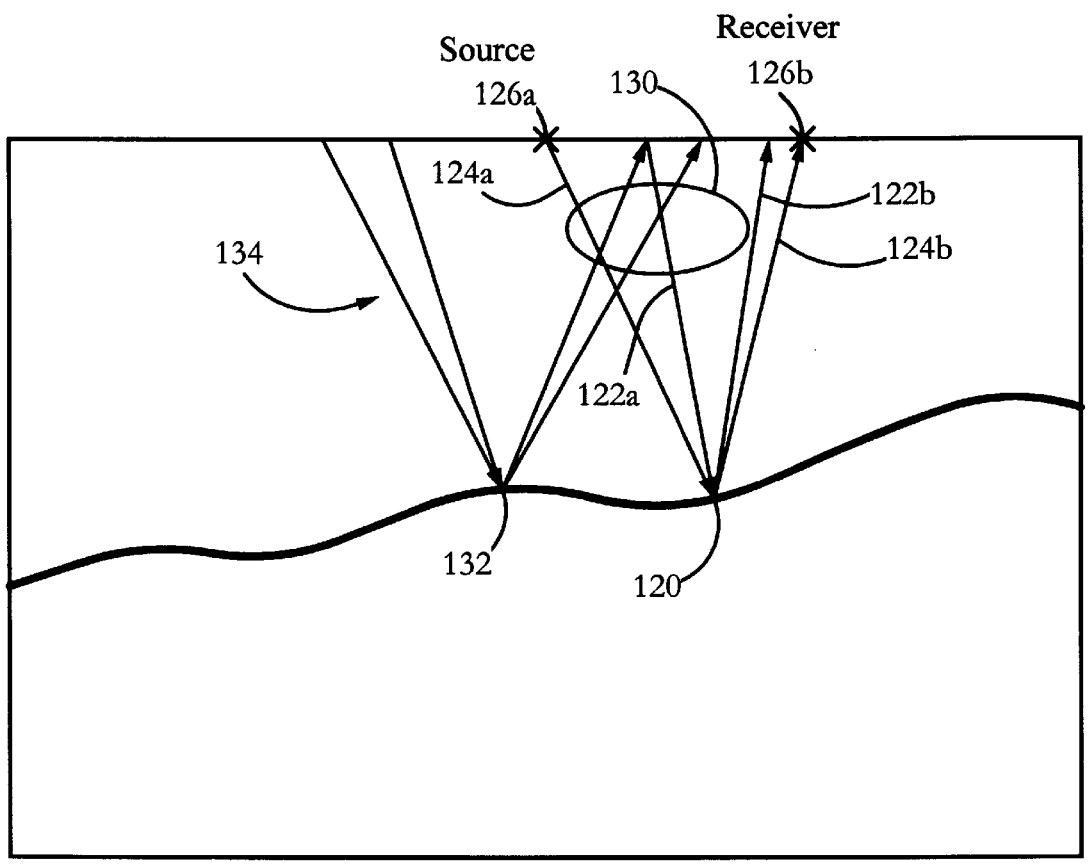
FIG. 6-C

TYPING PICKS TO HORIZONS IN MIGRATION VELOCITY ANALYSIS

RELATED APPLICATION DATA

This application claims the priority date of U.S. Provisional Patent Application No. 60/223,458, filed Aug. 7, 2000, which is herein incorporated by reference. This application is related to U.S. patent application Ser. No. 09/877,133, filed Jun. 8, 2001, entitled "Velocity Analysis Using Angle-Domain Common Image Gathers," which is herein incorporated by reference.

FIELD OF THE INVENTION

This invention relates to geophysical prospecting using seismic signals, and in particular to systems and methods for estimating seismic velocity.

BACKGROUND

Effectively searching for oil and gas reservoirs often requires imaging the reservoirs using three-dimensional (3-D) seismic data. Seismic data is recorded at the earth's surface or in wells, and an accurate model of the underlying geologic structure is constructed by processing the data. 3-D seismic imaging is perhaps the most computationally intensive task facing the oil and gas industry today. The size of typical 3-D seismic surveys can be in the range of hundreds of gigabytes to tens of terabytes of data. Processing such large amounts of data often poses serious computational challenges.

Obtaining high-quality earth images necessary for contemporary reservoir development and exploration is particularly difficult in areas with complex geologic structures. In such regions, conventional seismic technology may either incorrectly reconstruct the position of geological features or create no usable image at all. Moreover, as old oil fields are depleted, the search for hydrocarbons has moved to smaller reservoirs and increasingly hostile environments, where drilling is more expensive. Advanced imaging techniques capable of providing improved knowledge of the subsurface detail in areas with complex geologic structures are becoming increasingly important.

Obtaining high-quality images of subsurface structures typically requires having an accurate velocity model of the subsurface region of interest. One commonly-used method of improving the accuracy of velocity models is Migration Velocity Analysis (MVA). A known MVA approach is based on Common Reflection Point (CRP) gathers generated by 3-D prestack Kirchhoff migration. For further information on CRP gathers see Stork, "Reflection Tomography in the Postmigrated Domain," *Geophysics* 57:680–692 (1992), and Deregowski, "*Common Offset Migration and Velocity Analysis,*" *First Break* 8(6):224–234 (1990). The CRP gathers contain redundant structural information which can be used to correct the velocity model. In a conventional approach, a residual velocity value that corresponds to a horizontal alignment of events on a CRP is computed for a plurality of locations within the velocity model. The computer residual velocity values are then employed in updating the velocity model. Conventional MVA using CRP gathers can suffer from accuracy and complexity problems, however.

SUMMARY

The present invention provides a geophysical velocity analysis method comprising the steps of: establishing a seismic data set and a velocity model corresponding to a seismic exploration volume; generating a set of common image gathers for the volume from the seismic data set and the velocity model; computing a velocity parameter value for each of the common image gathers; tying the velocity parameter value to a geological horizon; and updating the velocity model using the velocity parameter value tied to the geological horizon.

Tying the velocity parameter value to the geological horizon can include snapping the velocity parameter to the geological horizon, or vertically interpolating the velocity parameter value along the geological horizon from velocity parameter values for neighboring points corresponding to common image gathers. The velocity parameter is preferably a residual velocity or slowness.

DESCRIPTION OF THE FIGURES

FIG. 2-A illustrates an exemplary angle-domain common image gather (ACIG) according to the present invention.

FIG. 2-B illustrates an exemplary offset-domain common image gather (common reflection point, CRP) gather according to the present invention.

FIG. 6-A schematically illustrates a vertical velocity update process according to the present invention.

FIG. 6-B schematically illustrates a normal ray velocity update process according to the present invention.

FIG. 6-C schematically illustrates a tomographic velocity update process according to the present invention.

DETAILED DESCRIPTION

The following description illustrates the present invention by way of example and not necessarily by way of limitation. In the following description, unless explicitly specified otherwise, the term velocity will be understood to encompass both speeds and slownesses. As the skilled artisan appreciates, it is understood that the equations disclosed herein are not changed by the mere use of other equivalent variables (velocity instead of slowness, angle instead of ray parameter, etc.) to represent the same equation. Thus, the statement that a path is generated according to an equation is understood to encompass generating the path by any method that satisfies the equation, regardless of the particular names of the variables employed in that method. Any reference to an element is understood to refer to at least one element. A set of elements is understood to include one or more elements.

Figure 1:
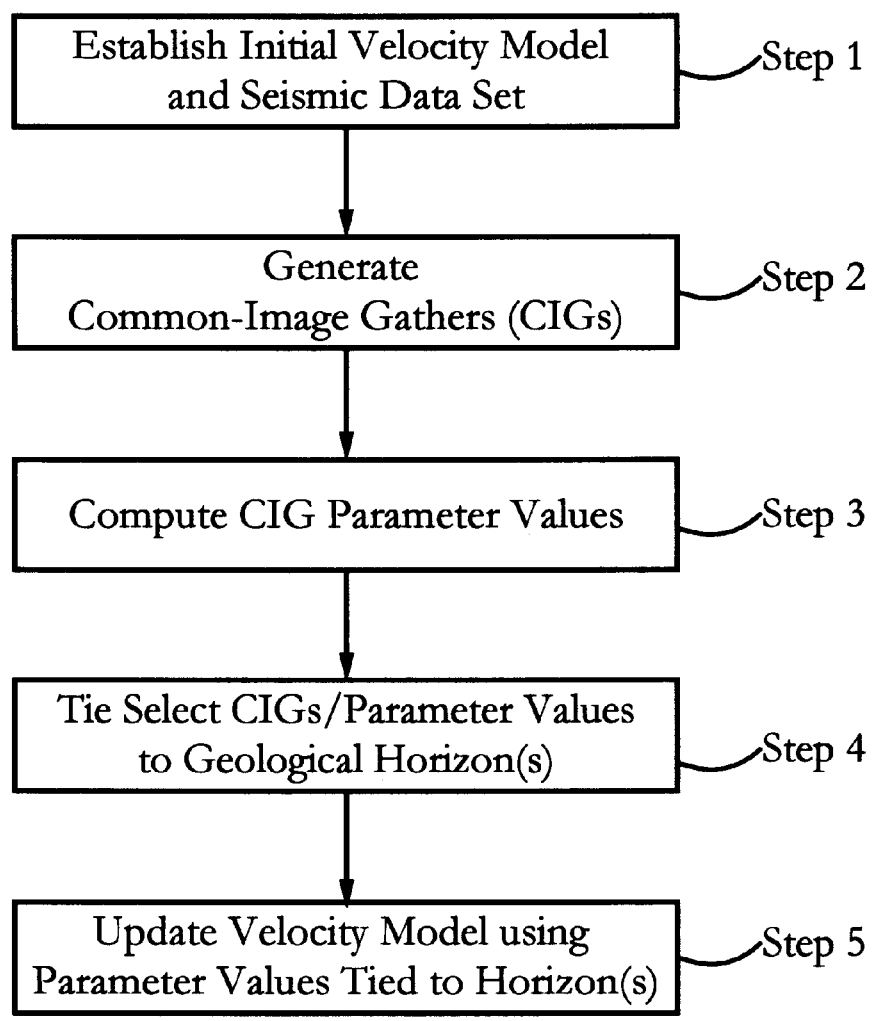
FIG. 1 is a flow chart outlining a preferred migration velocity analysis method of the present invention.

FIG. 1 is a flowchart illustrating the steps of a preferred velocity analysis method of the present invention.

1. Initialization

In step 1, a seismic data set and a velocity model for a seismic exploration volume of interest are provided by well known methods. The seismic data set preferably includes real data recorded on the earth's surface or within wells using geophones or hydrophones. The seismic data set can also include synthetic data corresponding to the earth's surface, to some underground surface or other locations. Synthetic data may be generated from real data, other synthetic data, velocity data, and/or petrophysical rock data. The velocity model is a 3-D array describing the distribution of velocities on a grid within the volume of interest. The grid is preferably a Cartesian (x-y-z) grid, although spherical, tetragonal, hexagonal or other grids may also be used.

2. Generating Common Image Gathers (CIGs)

In step 2, a plurality of Common Image Gathers (CIGs) are generated by pre-stack depth migration (PSDM) performed using the data set and velocity model for the volume of interest. Each CIG corresponds to one location within the volume of interest, and contains migrated amplitudes for that location arranged as a function of incident angle parameter or offset. The CIGs are preferably generated using a wave-equation migration method, but can in general be generated using other methods such as Kirchhoff migration.

In one embodiment, the CIGs are angle-domain common image gathers (ACIGs), which contain migrated amplitudes arranged as a function of angle parameter. FIG. 2-A shows an exemplary ACIG generated according to the present invention. In FIG. 2-A, the vertical axis denotes depth while the horizontal axis denotes an incident angle parameter p. The incident angle parameter, also termed the ray parameter, is indicative of the angle of incidence of plane-waves incident at each location of interest. Each trace in FIG. 2-A corresponds to a plane wave corresponding to a given angle parameter. Each trace represents the migrated amplitudes for its corresponding angle parameter. For further information on ACIGs, see the above-incorporated U.S. patent application Ser. No. 09/877,133.

In another embodiment, the CIGs are offset-domain common image gathers, which are commonly referred to as common reflection point (CRP) gathers. CRP gathers contain migrated amplitudes arranged as a function of offset. FIG. 2-B shows an exemplary CRP gather according to the present invention.

If the velocity model used to generate the CIGs (ACIGs or CRPs) is accurate, the migrated events are imaged at the same depth—i.e. are lined up horizontally. If the velocity model is not accurate, the migrated events are usually not flat on a CIG. The velocity model can be changed such that the migrated events on a CIG are horizontally aligned, as explained in more detail below.

3. Computing Velocity Parameters

Referring back to FIG. 1, in step 3, a velocity parameter value is computed for each CIG as described below. Each velocity parameter value is indicative of the horizontal alignment of events on the corresponding CIG, and is thus indicative of the accuracy or correctness of the velocity model employed to generate the CIG. In the preferred embodiment, the velocity parameter value is a residual velocity or residual slowness squared. In other embodiments, the velocity parameter may be a velocity (slowness), curvature, or flatness. The velocity parameter values for selected CIGs are subsequently used for updating the initial velocity model, as described below.

The following discussion will concentrate primarily on determining residual velocities for angle-domain common image gathers (ACIGs). For further information on velocity analysis methods employing common reflection point gathers (CRPs), see for example the above-referenced articles by Stork, "Reflection Tomography in the Postmigrated Domain," *Geophysics* 57:680–692 (1992), and Deregowski, "Common Offset Migration and Velocity Analysis," *First Break* 8(6):224–234 (1990).

Consider a time-migrated slant stack gather with traces ordered by ray parameter. The slant stack time is governed by the parabolic moveout paths $$\tau^2 = \tau_0^2 (1 - p^2 v^2), \quad [1]$$

wherein $\tau_0$ is the zero-offset or zero-ray parameter two-way traveltime, $\tau$ is the traveltime at a select ray parameter, p is the ray parameter, and $v^2$ is the RMS velocity squared.

The parabolic moveout of eq. [1] can be transformed from the time domain to the depth domain. For a given ray parameter, the depth position of an event on an ACIG obeys the angle-domain residual moveout equation $$z = z_0 \sqrt{\frac{(1 - p^2 v^2)}{(1 - p^2 \hat{v}^2)}}, \quad [2]$$

wherein $z_0$ is the depth at zero-ray parameter, z is the depth at a select ray parameter, $v^2$ is the actual RMS velocity squared, and $\hat{v}^2$ is the trial RMS velocity squared.

The moveout path of eq. [2] can be further rendered as a function of RMS residual velocity as $$z = z_0 \sqrt{\frac{(1 - p^2 (\hat{v} + \Delta v)^2)}{(1 - p^2 \hat{v}^2)}}, \quad [3]$$

wherein $\Delta v$ is the RMS residual velocity. Equation [3] describes the dependence of the depth difference $\Delta z = z - z_0$ on residual velocity $\Delta v$.

Figure 3:
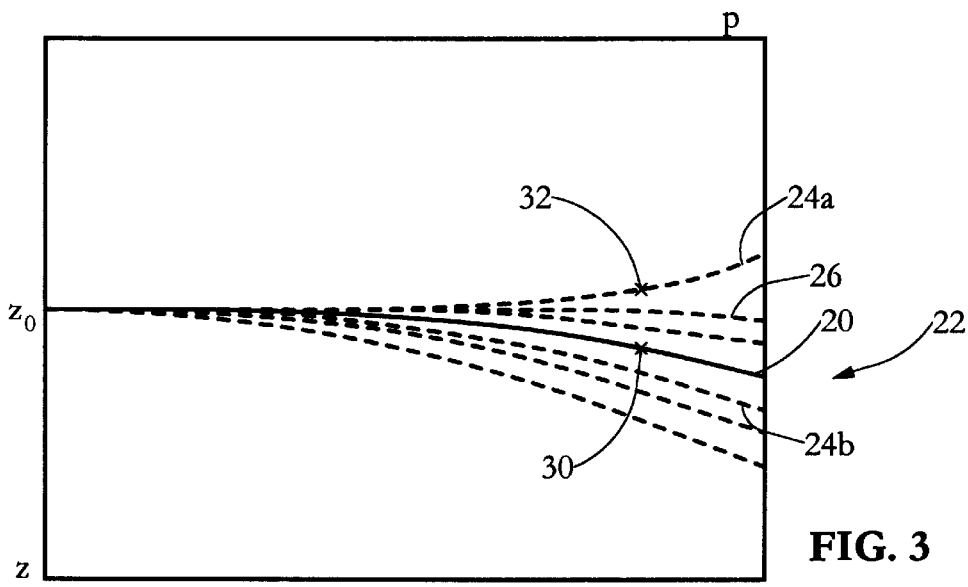
FIG. 3 is a schematic illustration of exemplary common image gather data and a set of associated moveout paths corresponding to a suite of residual velocities, according to the present invention.

In the preferred embodiment, residual moveout governed by eq. [3] is performed on each ACIG for the region of interest with a suite of trial residual velocities $\Delta v$. FIG. 3 schematically illustrates an arbitrary event path 20 of an ACIG, and a set of associated moveout paths 22 generated by performing residual moveout according to eq. [3] on the data of event path 20. For simplicity, FIG. 3 shows only one event path 20 representing the alignment of a set of migrated events. Residual moveout can be performed on the entire data of the ACIG, not only on the data of event path 20. In the preferred embodiment, residual moveout is performed on all data of each ACIG, although in general residual moveout may be performed only on selected parts of the data of each ACIG.

Each moveout path 22 uniquely corresponds to a residual velocity value $\Delta v$. Each moveout path 22 is generated by effectively shifting the events of event path 20 vertically by the difference between z and $z_0$ given by eq. [3]. Residual moveout effectively moves each event located at a depth z along event path 20 to a new depth $z_0$ along a corresponding moveout path 22. For example, for a given residual velocity $\Delta v$ corresponding to a moveout path 24a, an event 30 along event path 20 is effectively shifted to an event 32 along path 24a. The depth difference between events 30 and 32 is given by eq. [3].

When the correct residual velocity value $\Delta v$ is used, the corresponding moveout path 22 is substantially horizontal. Some moveout paths 22 may curve upward at higher ray parameters, as illustrated by an exemplary moveout path 24a. The upward curvature of moveout path 24a indicates that the velocity value corresponding to moveout path 24a is too low. Similarly, some moveout paths may curve downward at higher ray parameters, as illustrated by an exemplary moveout path 24b. The downward curvature of moveout path 24b indicates that its corresponding velocity value is too high. Event path 20 curves downward at higher ray parameters, indicating that the trial velocity used to generate the corresponding ACIG is too high. A best-fit moveout path 26 corresponds to a quasi-horizontal alignment of migrated events. Best-fit moveout path 26 corresponds to a best-fit residual velocity value $\Delta v$.

Figure 4:
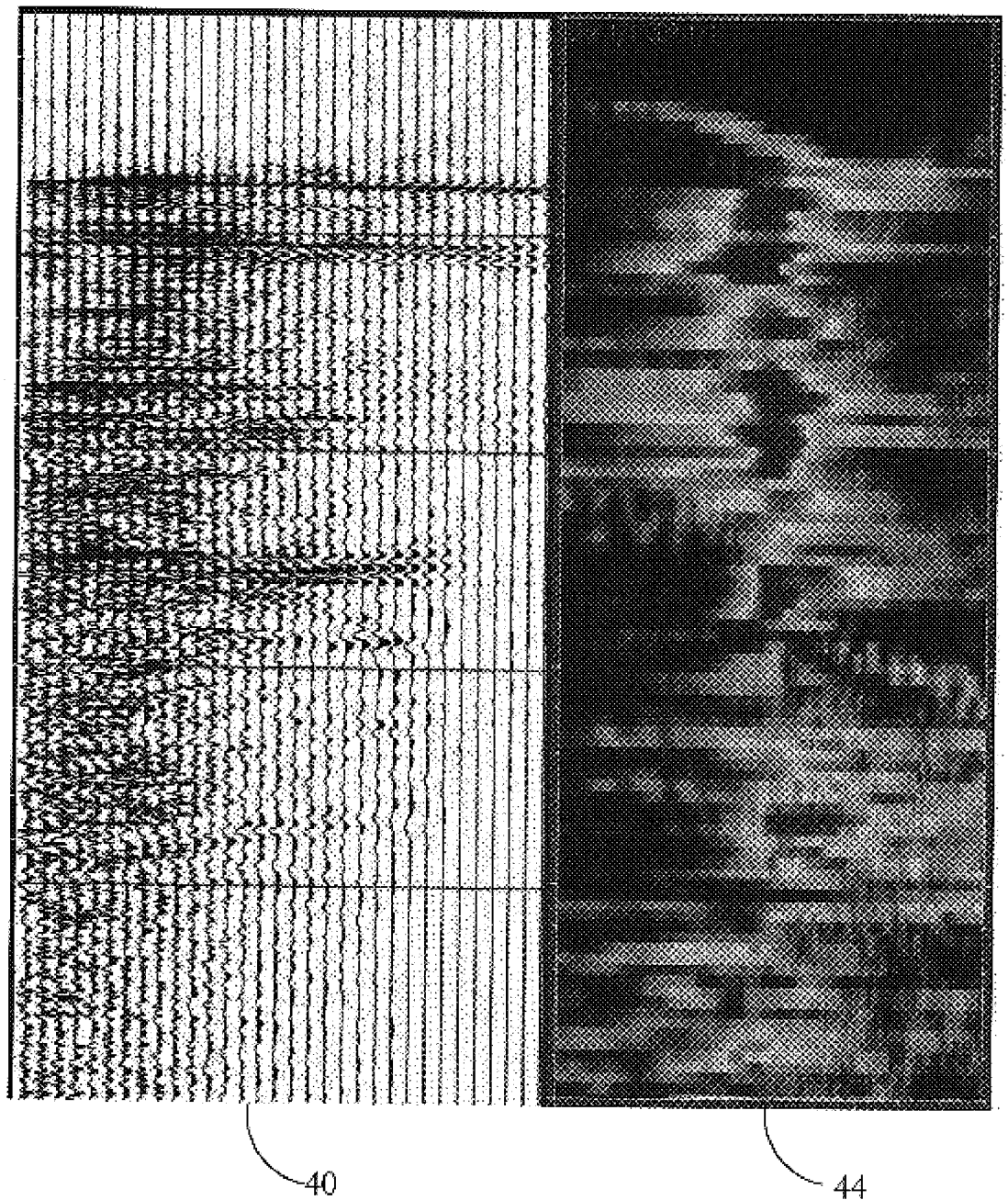
FIG. 4 shows an exemplary ACIG and a corresponding semblance panel according to the present invention.

Preferably, a semblance distribution over RMS residual velocity is then generated. FIG. 4 illustrates an arbitrary ACIG 40 and a corresponding semblance distribution panel 44 for ACIG 40. The vertical axis denotes depth, while the horizontal axis denotes angle parameter p in ACIG 40, and residual velocity $\Delta v$ in semblance panel 44. Semblance panel 44 is centered around $\Delta v=0$. The value at each (depth, residual velocity) point in semblance panel 44 is represented by the shade at that point.

In semblance panel 44, each semblance value for a given depth and residual velocity is equal to the sum of the amplitudes of the migrated events corresponding to that given depth and velocity. If, for a given residual velocity, the corresponding migrated events are aligned horizontally, the semblance corresponding to that residual velocity and to the depth of the migrated events will have a peak value at the zero line. Thus, peak semblance values correspond to the best-fit residuals that get the events of interest aligned horizontally.

Since residual moveout is applied over a range of illumination angles, ACIG residual analysis assumes that the scale of overburden velocity variations is greater than a cable length. Thus, lateral smoothing of residual slowness in velocity updating is preferably at least on the order of a cable length.

In the preferred embodiment, as described above, a set of moveout paths is generated by vertically shifting the data of each ACIG by a depth varying amount according to eq. [3], with a suite of residual velocity values $\Delta v$. Alternatively, a set of moveout paths can be first generated synthetically, without reference to the data of the corresponding ACIG, and then compared to the events of the ACIG. Each moveout path is generated by selecting a value of $z_0$ and a value of $\Delta v$, and then computing $z(p)$ according to eq. [3] for the selected values of $z_0$ and $\Delta v$. The computed function $z(p)$ defines the moveout path corresponding to the selected values of $z_0$ and $\Delta v$. All the moveout paths corresponding to a given value of $z_0$ are then compared to the event path of the ACIG that corresponds to that value of $z_0$. The comparison can be performed using a curve-fitting algorithm such as a least-squares algorithm. The moveout path that best fits the ACIG event path is selected as a best-fit moveout path, and the corresponding residual velocity $\Delta v$ is selected as a best-fit residual velocity.

In another embodiment, a subset of events along an event path are manually or automatically selected. For example, the events corresponding to predetermined angle parameters p can be automatically selected. A user can also manually pick the points to be used by clicking on an ACIG representation. Then, residual moveout or curve-fitting is performed only for the selected subset of events, rather than for the entire ACIG or for entire event paths. The selected subset of events then effectively forms the event path of interest.

In yet another embodiment, a set of ACIGs is generated with a suite of trial RMS velocities. Each ACIG in the set is generated from the same data set, but using a different trial velocity. The trial velocity that leads to horizontal alignment of events in its corresponding ACIG is then selected as a best-fit velocity. The horizontal alignment of events can be determined by semblance analysis as described above.

The best-fit residuals are preferably picked automatically, by selecting the residuals corresponding to the maximum semblance at each depth. The best-fit residuals can also be picked manually by a user from a display of a semblance scan. A user may visually evaluate a semblance scan and click on select semblance peaks at each depth of interest. Selecting semblance peaks effectively selects best-fit residuals corresponding to the selected peaks.

4. Tying Picks to Horizons

Figure 5:
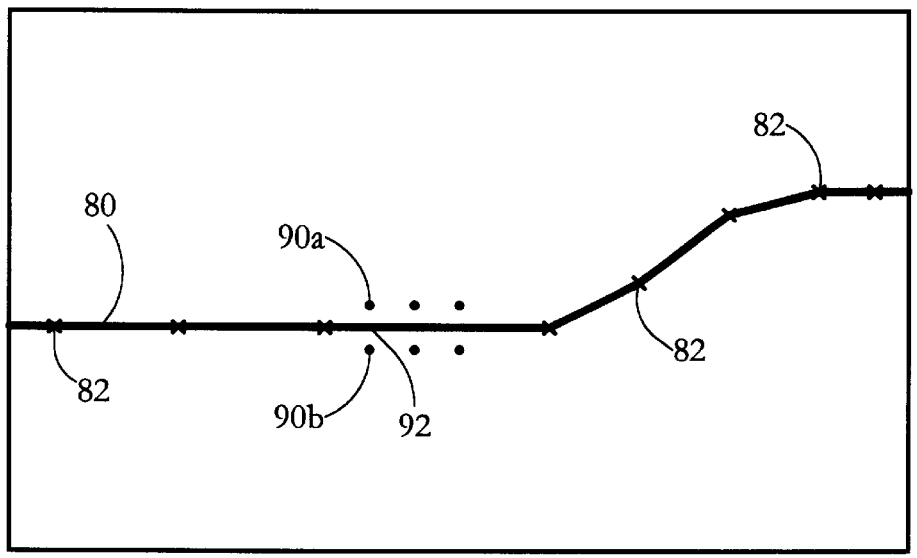
FIG. 5 illustrates a geological horizon and a plurality of neighboring points that can be tied to the geological horizon, according to the present invention.

In Step 4 (FIG. 1), select CIGs and corresponding best-fit velocity parameter values (e.g. best-fit residual velocity values) are tied to geological horizons. Geological horizons which usually exhibit strong reflectivity and good lateral continuity are first picked from stacked section, stacked PSDM, or poststack migration images. A user can visually inspect such an image, and click on horizon points to select them for further processing. FIG. 5 illustrates an arbitrary, generally horizontal geological horizon 80. Horizon 80 includes a plurality of horizon points 82 selected by a user.

Following the selection of horizon points 82 by the user, two levels of linear interpolation or extrapolation can be employed. In a first step, horizon 80 is constructed from horizon points 82 by lateral interpolation between horizon points 82. The lateral interpolation generates intermediate horizon points positioned between the picked horizon points 82. Horizon 80 is then a regularized horizon surface, In a second step, previously determined velocity parameter (e.g. residual velocity) values at CIG grid points 90a–b neighboring horizon 80 are tied to horizon 80. As a result of this mapping or tying step, every grid point along horizon 80 is assigned a velocity parameter value such as an RMS residual velocity value.

Tying a CIGs and associated velocity parameter value to horizon 80 can be achieved by snapping or vertical interpolation. Snapping involves setting a velocity parameter value for an arbitrary horizon point 92 to be equal to the velocity parameter value for point 90a, a CIG grid point adjacent to horizon point 92. Vertical interpolation involves determining a velocity parameter value for horizon point 92 by interpolation using the velocity parameter values for CIG grid points 90a–b, which neighbor horizon point 92 on opposite (top/bottom) sides.

Subsequent velocity update steps are then performed selectively, using only the subset of velocity parameter values corresponding to selected horizons such as horizon 80. Several methods can be used to back-project residuals tied to horizons to the overburden layers, as described in more detail below.

Tying velocity parameter values such as residual velocity values to geological horizons allows reducing the deleterious effects of noise in the seismic data on the velocity update step. An algorithm which takes into account residual values at all analysis points can be adversely affected by noise in the data.

A level of sophistication can be added by using a layer freezing and layer stripping approach, which has the advantage of eliminating compounded velocity estimation errors from upper layers for estimation of lower layers. Overall, the layer stripping approach renders velocity estimation in a more stable and optimized manner compared to multi-layer simultaneous update. Given a layer with fixed velocity, residual values are deemed to be zero, implying events within this frozen layer have been presumably flattened on ACIGs. Residual picking with the layer-freezing feature prevents contamination of velocity due to noise and unwanted modification in iterative updating. It also better conditions the start state of residual picking and calculation of RMS velocity for unfixed layers.

5. Updating the Velocity Model

In step 5 (FIG. 1), the velocity model is selectively updated using residual velocities along selected geological horizons. Three progressively more sophisticated methods can be used for updating the velocity model: vertical ray update, normal ray update, and tomographic update. Each method is described in detail below. The following discussion will focus primarily on angle-domain common image gathers (ACIGs). As a skilled artisan readily appreciates, corresponding velocity update methods can be employed for residual velocity values corresponding to CRPs.

5A. Vertical Velocity Update

FIG. 6-A illustrates schematically a vertical velocity update process for three locations 40a–c situated along a reflector (horizon) 44. Each location 40a–c corresponds to an individual ACIG. Reflector 44 is situated above another reflector 46, which in turn is situated above an imaging target region of interest 48. The best-fit residual velocity values computed for the ACIG corresponding to location 40a are used to update the velocity model along a vertical line 50a extending upward from location 40a. At each point along vertical line 50a, the velocity model is updated by the sum of the background (trial) velocity and the computed best-fit residual velocity corresponding to that point. Similarly, the best-fit residuals computed from the ACIGs corresponding to locations 40b–c are used to update the velocity model along vertical lines 50b–c extending upward from locations 40b–c, respectively.

The vertical velocity update method is preferred for preliminary velocity analysis in cases of flat or nearly flat layered structures and smooth velocity variations, because of the 1D layering assumption of the method. For further information on vertical velocity update methods, see for example the article by Deregowski, "Common Offset Migration and Velocity Analysis," *First Break* 8(6):224–234 (1990).

The Dix inversion formula can be applied to RMS residual velocity for estimating interval residual velocity values. For information on Dix inversion, see the article by Dix, "Seismic Velocities from Surface Measurements," *Geophysics* 20:68–86 (1955).

A first step involves lateral smoothing of horizon-based residual velocity distribution individually for each horizon. The lateral smoothing scale should be about the size of a cable length. The second step should perform a depth-to-time conversion for the horizons and the associated residual values. This conversion is followed by several steps to derive interval residual slowness from RMS residual velocity.

In one embodiment, RMS residual velocity is converted to RMS residual velocity squared. The latter is a function of the former and background RMS velocity. The sign of residual variables indicates the moveout direction of events at analysis points on ACIGs. For example, a negative value of RMS residual velocity corresponds to a down-going swing on ACIGs resulted from overmigration. Then, RMS residual velocity squared is converted to interval residual velocity squared. Interval residual velocity squared is calculated from RMS residual velocity squared based on the Dix method. The assumption made with the Dix method, i.e. small offset data and horizontal layering, still holds valid for converting residual values. In practice, the strict assumption can be relaxed to a certain degree (e.g. applying to slightly dipping layers) without sacrificing much loss in accuracy. The denominator in the Dix formula is preferably constrained to be non-zero valued. Finally, interval residual velocity squared is converted to interval residual slowness.

Interval residual slowness can be expressed as a function of interval residual velocity squared and initial interval velocity. The square root term needs to be constrained so that any negative residual velocity squared never exceeds the initial velocity squared in magnitude.

In another embodiment, RMS residual velocity is converted to interval residual velocity. Interval velocity is then calculated from RMS residual velocity using the Dix method. Then, interval residual velocity is converted to interval residual slowness. Interval residual slowness is expressed as a function of interval residual velocity and initial interval velocity.

Based on the fact that linear smoothing of a slowness distribution keeps the kinematic fidelity of wave propagation, it is often desirable to smooth residual slowness values instead of residual velocity before adding the residual values to the background velocity. A triangle filter can be used to smooth a residual slowness field. The filter has an apparent effect of reducing a spike to a symmetric triangle.

After smoothing and filtering, the relations $$\Delta v = \frac{1}{s_0 + \Delta s} - \frac{1}{s_0}, \qquad [4b]$$

wherein $s_0$ is an initial slowness field, can be used to derive residual slowness from residual velocity or residual velocity from residual slowness. Residual velocity values have the opposite signs of residual slowness values. Migration with too slow a velocity results in positive values of residual velocity, implying that the initial migration velocity should be increased. The final velocity value is the sum of the background and residual velocity at every grid point.

5B. Normal Ray Update

FIG. 6-B illustrates schematically a normal ray velocity update process for the three locations 40a–c situated along reflector 44. As described above with reference to FIG. 6-A, each location 40a–c corresponds to an individual ACIG. The best-fit residual velocity values computed for the ACIG corresponding to location 40a are used to update the velocity model along a normal ray 60a extending generally upward from location 40a, toward the earth surface. Normal ray 60a is perpendicular to reflector 44 at location 40a. At each point along normal ray 60a, the velocity model is updated by the sum of the background (trial) velocity and the computed best-fit residual velocity corresponding to that point. Similarly, the best-fit residuals computed from the ACIGs corresponding to locations 40b–c are used to update the velocity model along normal rays 60b–c extending upward from locations 40b–c, respectively. Each normal ray 60b–c is perpendicular to reflector 44 at its corresponding intersection location 40b–c.

One limitation of vertical updating methods lies in its simplification of backprojection methods. In cases where layers are flat or slightly dipping, vertical back projection works well. However, in dealing with more complex structures, vertical backprojection can wrongfully misplace residual velocity values. For example, in cases of steeply dipping layers, reflections occur along an oblique direction normal to the dipping horizon instead of along the vertical direction. Although waves may illuminate a steeply dipping surface at different incidence angles, it is usually those waves with small incidence angles with respect to the horizon normal that get recorded at the surface. A specular ray normal to a dipping surface may better represent wave propagation in this case. The advantage of normal ray update lies in its ability to back project residual velocities along a more accurate path to better account for reflections from steeply dipping reflectors. However, there is also more computational cost involved with normal ray update than vertical update because accurate ray path of a specular normal ray needs to be determined by ray tracing.

To perform horizon-based interlayer velocity updating, intersection points of raypaths and select horizons are determined. The intersections are converted from the depth to the time domain using a migration velocity. Two-way traveltimes associated with the intersections can be then used in the Dix formula to convert RMS residual velocity squared to interval residual velocity squared and further reduced to residual velocity. Alternatively, the two-way traveltimes can be used to convert RMS residual velocity to interval residual velocity.

In cases of flat layers, these traveltimes determined from ray tracing are equal to those used in vertical update. But in cases of steeply dipping layers, the traveltimes calculated in normal ray update can be different from those in vertical udpate. The greater the dip angle is, the bigger the difference is between the two sets of traveltimes.

Since normal rays may cross each other in areas with complex structural and velocity variations, velocity updating may become non-unique at certain places in the model. Theoretically, linear regression can be done to seek an optimal distribution of all back projected residual values. A simplified implementation is to linearly average all the back projected residual values at select updating points.

5C. Tomographic Update

FIG. 6-C illustrates schematically tomographic MVA for postmigrated data. An image point (reflection event) 120 is illuminated by plane waves at multiple different ray parameters (corresponding to different angles), as illustrated by the arrow pairs 122a–b, 124a–b. Each arrow pair corresponds to a source and a receiver, as exemplified by source 126a and receiver 126b. On the ACIG for point 120, the depth of reflection event 120 corresponding to arrow pair 122a–b may differ from the depth corresponding to arrow pair 124a–b. The difference in depth may depend on an inaccurate velocity model for a subsurface region such as region 130. The velocity inaccuracy in region 130 affects ACIGs for points other than point 120, as illustrated by the point 132 and the corresponding arrows 134.

Reflection tomography performed in the post migrated domain has several advantages over standard tomography performed on prestack data. In general, postmigrated events are easier to pick, data volume is more manageable, and the whole process is more robust. The procedure converts the ACIG picks to velocity changes using 3-D tomographic backprojection. As in the previously described methods, the objective is to flatten ACIGs. For further information on reflection tomography, see for example Stork et al., "An Implementation of Tomographic Velocity Analysis," *Geophysics* 56(4):483–485 (1991), and Stork, "Combining Reflection Tomography with Migration Velocity Analysis," 61$^{st}$ Meeting of the *European Association of Exploration Geophysicists, Extended Abstracts*, 256–257 (1992).

Tomographic migration velocity analysis is superior to both vertical and normal ray updating methods in its velocity-resolving capability. In a vertical updating method, the seismic energy is assumed to propagate only vertically. In normal ray updating methods, the energy propagation and sources of migration errors are treated more accurately along a specular ray normal to geologic horizons. In tomographic MVA, a fan of rays with correct wave propagation geometry are used to back project residual velocities to the places where the errors originated.

Generally, the extent of the depth deviation corresponds to a residual traveltime associated with a ray pair from a source point to an image point and back to a receiver point. Several ray pairs through the same image point or reflection point with different ray parameters approximate down-going wave propagation from seismic sources to the image point and up-going propagation from the image point to receivers on the surface. In 3-D cases, each tube of rays from an analysis common image point illuminates part of the overburden velocity, and several overlapping ray tubes can be used to reconstruct the overburden velocity properties in a tomographic (e.g. global optimization) manner.

Tomographic MVA can be considered to comprise two basic components: forward modeling and tomographic reconstruction. The latter determines a residual velocity distribution through linear optimization or regression. Forward modeling in tomographic MVA provides residual traveltimes for tomography. It calculates residual traveltimes associated with rays taking off from each common image point. Horizon-based tomographic MVA does forward modeling only for those ACIGs tied to geological horizons.

To calculate residual traveltimes, residual velocities picked from ACIGs are first converted to depth deviations at each ray parameter along parabolic moveout according to eq. [3]. Residual traveltimes associated with each ray pair can be further refined by taking into account ray-parameter-dependent depth deviations using the vertical component of incoming and outgoing ray parameter at the reflection point. The residual traveltimes are then given by $$\Delta\tau = (p_{sz} + p_{rz})\Delta z, \quad [5]$$

wherein $\Delta z$ is the ray parameter-dependent depth deviation, and $p_{sz}$ and $p_{rz}$ are the ray parameters of the down-going and up-going wave, respectively, at the reflection point, measured with respect to the vertical direction.

As a special case, in the postmigrated 2D domain, the deviation from flatness of ACIGs gives residual depths $$\Delta\tau = 2s\Delta z \cos\phi\cos\theta, \quad [6]$$

wherein s is the slowness above the reflector, $\phi$ is the reflection dip, $\theta$ is the angle of the incident ray with respect to the normal to the reflector surface, and $\Delta\tau$ is the residual traveltime caused by the extra path length due to the residual depth $\Delta z$.

The residual travel time $\Delta\tau$ is linearly related to the residual slowness $\Delta s$ and the differential path length $\Delta\Gamma$ by $$\Delta\tau = \int_\Gamma \Delta s\, d\Gamma. \quad [7]$$

To correct for perturbations in residual traveltimes due to reflector geometry and location, eq. [7] can be replaced with $$\Delta\tau = \int_\Gamma \Delta s\, d\Gamma - \frac{p_{sz} + p_{rz}}{s_\perp} \int_{\Gamma_\perp} \Delta s\, d\Gamma_\perp, \quad [8]$$

wherein $s_\perp$ is the slowness at the normal reflection point corresponding to the residual traveltime $\Delta\tau$, and $d\Gamma_\perp$ is the differential path length along a specular ray normal to the reflective surface (geologic horizon) corresponding to the residual traveltime $\Delta\tau$. The second term of the right hand side of equation [8] is a correction term which accounts for perturbations in residual traveltimes due to reflector geometry and location.

The residual slowness can be discretized onto a gridded model so that the integral is written as a matrix equation $$\Delta\tau = \Gamma \Delta s \qquad [9]$$

wherein $\Gamma$ is a matrix of ray segment lengths in a given slowness cell. The residual slowness $\Delta s$ can be determined from eq. [9] using the conjugate gradient method.

Tomography is particularly applicable for complex models where overburden velocity variations which must be resolved are generally less than a cable length in the lateral extent.

Once an updated velocity model is generated, the above described steps (FIG. 1) can be applied again until most reflection events are flattened on ACIGs. Stacking flattened events over ray parameters produces optimally-focused structural images.

In another embodiment, a plurality of ACIGs are generated for each location with a suite of trial velocities $\hat{v}$. Each ACIG is then evaluated, for example by performing a semblance scan over the ACIG data. A best-fit trial velocity is then selected for each ACIG. The best-fit trial velocity is the velocity that best aligns the events of the ACIG horizontally. Selected best-fit velocities are then used in a velocity update process as described above.

5. Discussion

The principle of velocity estimation is to use redundant information to feedback and therefore correct any deviations from the actual velocity model. The above-described methods are based on flattening events along the ray parameter axis of Angle-Domain Common Image Gathers, or along the offset axis of CRP gathers.

It has been observed that data of poor quality can give rise to unstable estimation results. Therefore, it is often desirable to constrain and laterally smooth the input and some intermediate parameters for stable estimation. ACIG residual scanning and automatic velocity update is most useful for preliminary velocity building before any geological horizons are identified or in areas with fine flat layering structures. Vertical velocity update can then be used to improve the velocity model based on geological horizons.

In terms of computational cost, vertical update does not require time consuming ray tracing and is most efficient. If layers are steeply dipping, normal ray update is a more accurate method to better approximate wave propagation influenced by dipping reflectors. Vertical ray updating methods assume a 1D layering structure, and both vertical and normal ray updating methods assume smooth variations in the velocity distribution. In areas with complex geological structures and large velocity variations, tomographic MVA may be applied to better determine the velocity field through linear optimization. However, the computational cost is also higher due to increased workload of ray tracing and inversion. In addition, the accuracy and reliability of ray tracing in the presence of velocity anomalies with irregular geometry and high velocity contrast should be considered.

Vertical, normal ray, and tomographic updating methods can update horizon depth positions simultaneously along with velocity in each iteration. All three methods can also be applied to multiple layers as well as layer-stripping velocity estimation. If the geological structure is consistent and velocity variations are smooth in a region, multiple layer velocity updates can be done simultaneously. However, for complex structures and large velocity variations, a layer freezing and layer stripping approach is preferred since it better conditions the estimation for each layer and prevents compounding of velocity estimation errors.

The above-described methods are preferably implemented on general-purpose computers. The present invention provides apparatus and general-purpose computers programmed with instructions to perform methods of the present invention, as well as computer-readable media encoding instructions to perform methods of the present invention.

It will be clear to one skilled in the art that the above embodiments may be altered in many ways without departing from the scope of the invention. For example, as is apparent to the skilled artisan, actual velocities or slownesses can be used as convenient, and/or angle or ray parameter may be used as convenient. Accordingly, the scope of the invention should be determined by the following claims and their legal equivalents.

What is claimed is:

1. A migration velocity analysis method comprising the steps of:
    a) establishing a seismic data set and a velocity model corresponding to a seismic exploration volume;
    b) performing migration on the seismic data set using the velocity model to generate a set of common image gathers for the volume;
    c) computing a set of residual velocity values each corresponding to one of the common image gathers;
    d) tying a residual velocity value from the set of residual velocity values to a geological horizon; and
    e) updating the velocity model using the residual velocity value tied to the geological horizon.

2. The method of claim 1, wherein tying the residual velocity value to the geological horizon comprises snapping the residual velocity value to the geological horizon.

3. The method of claim 1, wherein tying the residual velocity value to the geological horizon comprises vertically interpolating a residual velocity value along the horizon from a residual velocity value for a common image gather.

4. The method of claim 1, further comprising the step of representing the residual velocity values as residual slownesses squared.

5. The method of claim 1, further comprising the step of generating the geological horizon by generally horizontal interpolation from a set of selected geological horizon points.

6. The method of claim 1, wherein the common image gather is an offset-domain common image gather.

7. The method of claim 1, wherein the common image gather is an angle-domain common image gather.

8. The method of claim 1, wherein updating the velocity model is performed along a vertical ray.

9. The method of claim 1, wherein updating the velocity model is performed along a ray normal to the geological horizon.

10. The method of claim 1, wherein updating the velocity model is performed tomographically.

11. A migration velocity analysis method comprising the steps of:
    a) establishing a seismic data set and a velocity model corresponding to a seismic exploration volume;
    b) generating a set of common image gathers for the volume from the seismic data set and the velocity model;
    c) computing a velocity parameter value for each of the common image gathers;
    d) tying the velocity parameter value to a geological horizon; and
    e) updating the velocity model using the velocity parameter value tied to the geological horizon.

12. The method of claim 11, wherein tying the velocity parameter value to the geological horizon comprises snapping the velocity parameter value to the geological horizon.

13. The method of claim 11, wherein tying the velocity parameter value to the geological horizon comprises vertically interpolating a velocity parameter value for the horizon from a velocity parameter value for a common image gather.

14. The method of claim 11, wherein the velocity parameter is a residual velocity.

15. The method of claim 11, wherein the velocity parameter is a velocity.

16. The method of claim 11, wherein the velocity parameter characterizes a curvature of said each of the common image gathers.

17. The method of claim 11, further comprising the step of generating the geological horizon by generally horizontal interpolation from a set of selected geological horizon points.

18. The method of claim 11, wherein the common image gather is an offset-domain common image gather.

19. The method of claim 11, wherein the common image gather is an angle-domain common image gather.

20. The method of claim 11, wherein updating the velocity model is performed along a vertical ray.

21. The method of claim 11, wherein updating the velocity model is performed along a ray normal to the geological horizon.

22. The method of claim 11, wherein updating the velocity model is performed tomographically.

23. A migration velocity analysis method comprising the steps of:
   a) tying a picked common image gather to a geological horizon of a seismic exploration volume; and
   b) updating a velocity model of the seismic exploration volume using the picked common image gather tied to the geological horizon.

24. The method of claim 23, wherein tying the picked common image gather to the geological horizon comprises snapping the picked common image gather to the geological horizon.

25. The method of claim 23, wherein tying the picked common image gather to the geological horizon comprises vertically interpolating a velocity parameter for the horizon from a corresponding velocity parameter for the picked common image gather.

26. A migration velocity analysis method comprising the steps of:
   a) establishing a seismic data set and a velocity model corresponding to a seismic exploration volume;
   b) generating a set of common image gathers for the volume from the seismic data set and the velocity model;
   c) computing a set of velocity parameter values each corresponding to one of the common image gathers;
   d) assigning a target velocity parameter value for a target location along a geological horizon, using a neighboring velocity parameter value corresponding to a common image gather for a location neighboring the target location; and
   e) updating the velocity model using the target velocity parameter value.

27. The method of claim 26, wherein assigning the target velocity parameter value comprises setting the target velocity parameter value substantially equal to the neighboring velocity parameter value.

28. The method of claim 26, wherein assigning the target velocity parameter value comprises interpolating the target velocity parameter value from the neighboring velocity parameter value.

29. A computer programmed to performed the steps of:
   a) tying a picked common image gather to a geological horizon of a seismic exploration volume; and
   b) updating a velocity model of the seismic exploration volume using the picked common image gather tied to the geological horizon.

30. The computer of claim 29, wherein tying the picked common image gather to the geological horizon comprises snapping the picked common image gather to the geological horizon.

31. The computer of claim 29, wherein tying the picked common image gather to the geological horizon comprises vertically interpolating a velocity parameter for the horizon from a corresponding velocity parameter for the picked common image gather.

32. A computer-readable medium encoding instructions to perform the steps of:
   a) tying a picked common image gather to a geological horizon of a seismic exploration volume; and
   b) updating a velocity model of the seismic exploration volume using the picked common image gather tied to the geological horizon.

33. The medium of claim 32, wherein tying the picked common image gather to the geological horizon comprises snapping the picked common image gather to the geological horizon.

34. The medium of claim 32, wherein tying the picked common image gather to the geological horizon comprises vertically interpolating a velocity parameter for the horizon from a corresponding velocity parameter for the picked common image gather.

35. A geophysical velocity analysis apparatus comprising:
   a) means for tying a picked common image gather to a geological horizon of a seismic exploration volume; and
   b) means for updating a velocity model of the seismic exploration volume using the picked common image gather tied to the geological horizon.

36. The apparatus of claim 35, wherein tying the picked common image gather to the geological horizon comprises snapping the picked common image gather to the geological horizon.

37. The apparatus of claim 35, wherein tying the picked common image gather to the geological horizon comprises vertically interpolating a velocity parameter for the horizon from a corresponding velocity parameter for the picked common image gather.

* * * * *

UNITED STATES PATENT AND TRADEMARK OFFICE
CERTIFICATE OF CORRECTION

PATENT NO. : 6,687,618 B2
DATED : February 3, 2004
INVENTOR(S) : Dimitri Bevc, Alexander M. Popovici and Wei Liu It is certified that error appears in the above-identified patent and that said Letters Patent is hereby corrected as shown below:

<u>Title page, Item [54] and Column 1, line 1,</u>
Title, replace "TYPING" with -- TYING --.

Signed and Sealed this

Twenty-seventh Day of April, 2004

JON W. DUDAS
*Acting Director of the United States Patent and Trademark Office*